United States Patent Office 3,475,199
Patented Oct. 28, 1969

3,475,199
FIRE-RETARDANT COATING
Murray Wolf, Great Neck, N.Y., assignor to Tri-Wall Containers, Inc., Plainview, N.Y., a corporation of New York
No Drawing. Filed Apr. 14, 1966, Ser. No. 542,477
Int. Cl. B44d 1/12; C09d 5/18; D21h 1/22
U.S. Cl. 117—92                                                                                          20 Claims

ABSTRACT OF THE DISCLOSURE

A fire-retardant coating composition comprising hexamethylene tetramine, a substantially non-volatile and heat-decomposable inorganic intumescent agent, and a binder containing a major proportion of a hydrocarbon wax.

---

This invention relates to fire-retardant coating compositions and more particularly to organic intumescent coating compositions which are useful in improving the fire and heat resistance of combustible porous cellulosic materials.

Numerous organic intumescent coating compositions for the coating of cellulosic materials in order to improve their fire and heat resistance are known in the art. These compositions generally include an organic binder and one or more intumescent agents incorporated in the binder for the purpose of producing a cellular ash which retards the spread of fire in the event that fire impinges on the coating. Coating compositions of this type have been used to coat a variety of combustible cellulosic materials, including wood, cellulosic wallboard, cardboard, paper, paperboard, and cellulosic fabrics such as cotton.

Various organic materials, notably polymeric materials, have been used in forming the organic binder in intumescent coating compositions. Intumescence is imparted to such compositions by the inclusion of one or more intumescent agents, among them various inorganic materials such as monoammonium phosphate, and various decomposable organic compounds such as dicyandiamide and hexamethylene tetramine. When flame impinges on an intumescent coating of this type, the coating becomes charred but does not burn readily, and a cellular structure which includes a combination of ash and char develops.

The presently known intumescent compositions have not been found to be satisfactory in the coating of Kraft paper liners in paperboard. These compositions form a comparatively thin layer of ash when exposed to flame, with the result that the paperboard retains an undesirable degree of combustibility.

An object of this invention is to provide an intumescent fire-retardant composition which gives a thicker carbonaceous crust than presently known fire-retardant compositions when exposed to flame.

A further object of this invention is to provide a flame-resistant cellulosic structural member having a fire-retardant intumescent coating which substantially reduces its combustibility.

These and other objects will be apparent from the description which follows.

The fire-retardant coating compositions of this invention comprise one or more intumescent agents and a binder which contains a hydrocarbon wax as its principal and preferably its sole constituent. The hydrocarbon wax is preferably a microcrystalline wax having a melting point in the range of about 130° to about 180° F. In addition to the hydrocarbon wax binder, the compositions of this invention comprise a combination of intumescent agents which includes hexamethylene tetramine and a substantially non-volatile and heat-decomposable inorganic compound. The inorganic compound is either an ammonium salt, a phosphate, or a sulfate. Additional intumescent agents may be incorporated if desired. In addition, the compositions of this invention may include additional materials, for example, pigments and fillers such as clay.

The compositions of the present invention may be either in the form of aqueous dispersions or in the form of dry blends for hot melt application. The coating composition in either form can be easily applied to the surface of the cellulosic material to be rendered flame-resistant.

It has been found surprisingly that a hydrocarbon wax makes an excellent binder for fire-retardant coating compositions, in spite of its high flammability. Hydrocarbon waxes, when compounded with intumescent agents as will hereinafter be described, give coating compositions which form a thicker carbonaceous crust than that formed by any previously known fire-retardant compositions when exposed to flame. As a result, the fire-retardancy of the compositions of this invention surprisingly is greater than that of previously known fire-retardant coating compositions, in spite of the high flammability of the hydrocarbon wax.

Preferred hydrocarbon waxes for making up the binders of this invention are acid-stable microcrystalline waxes. These waxes have melting points within the range of about 130° to about 170° F. as a rule, although the melting point may be either higher or lower. Acidic emulsions of these waxes are stable, and the waxes do not precipitate when added to the other solid ingredients of the dispersions of this invention. Although the preferred hydrocarbon waxes are microcrystalline, paraffin waxes can also be used for the purposes of this invention.

The preferred compositions of this invention use a hydrocarbon wax as the sole binder. Alternatively, however, one may use as the binder a composition containing a major proportion, i.e. more than about 50%, of a hydrocarbon wax. The minor constituent in such binders may include any organic binder material, for example, polymers and particularly vinyl polymers such as polyvinyl chloride and polyvinylidene chloride.

The binder constitutes about 25 to 30% by weight of the total solids content in the preferred coating composition of this invention. Greater or smaller amounts of binder may be used; however, the amount of binder usually will not be materially in excess of 40% of the total solids content, nor appreciably below 25% of the total solids content. The term, "total solids content", refers to the sum total of all ingredients, except water, in the coating composition.

The binder constitutes the principal source of carbon in the coating compositions of this invention. However, starch may be added to provide additional carbon if desired. In addition, the other carbonaceous constituents of the coating composition, such as hexamethylene, tetramine, may also serve as sources of carbon.

The intumescent agent, or spumific, of the present invention includes hexamethylene tetramine and a substantially non-volatile inorganic compound. The substantially non-volatile inorganic compound in most instances is a compound which decomposes with the formation of a gas at a temperature in the range of 300° to 600° F., and is usually either a phosphate, a sulfate, or an ammonium salt. Excellent results have been obtained with ammonium dihydrogen phosphate. However, other substantially non-volatile compounds, such as ammonium monohydrogen phosphate, sodium dihydrogen phosphate, ammonium sulfate, ammonium sulfamate, and a 50:50 (by weight) combination of borax and boric acid, may be used.

The substantially non-volatile inorganic intumescent agent is the principal intumescent agent. It constitutes about 30% of the total solids content of the coating composition, and may range in amounts from about 20% to about 35% of the total weight of solids. The ratio of hexamethylene tetramine to ammonium dihydrogen phosphate may range from about 50:70 to about 20:90 wherein the ratio is expressed in parts by weight. Other substantially non-volatile inorganic intumescent agents may be substituted approximately on an equal weight basis for ammonium dihydrogen phosphate.

In addition to hexametheylene tetramine and a substantially non-volatile inorganic material, the coatings of this invention may also include additional organic substances which yield gas upon decomposition. Dicyandiamide is an example of such a material. This material is present in comparatively small amounts, e.g. about one-third to a maximum of about one-half the weight of inorganic intumescent agent. The presence of additional intumescent materials such as dicyandiamide does not alter the ratio of hexamethylene tetramine to the substantially non-volatile material according to this invention.

Pigments and fillers can be added as desired. For example, clay is frequently added to the coating compositions of this invention. The preferred amount of clay is about 14–15% of the total solids content. Amounts more than about 25% above the preferred amounts, i.e., more than about 18–20% of the total solids content, are usually avoided as such large amounts adversely affect the intumescence of the composition. Clay can be omitted altogether without deleterious effect.

An alum, such as potassium aluminum sulfate, is advantageously added in order to improve the ash formed on charring of the coating composition. It is important for this ash to adhere to the cellulosic substrate, since an adherent ash increases the fire and heat resistance of the coating.

The compositions of this invention are preferably in the form of aqueous dispersions. Such dispersions are frequently markedly acidic because of the high acidity of the inorganic intumescent agent. Often the pH is as low as 2. The percentage of solids in the dispersions of this invention is usually in the neighborhood of 50%, as, for example, from about 45% to about 55%. The high acidity of the dispersion necessitates the use of an acid-stable wax, as already explained. It is preferred to prepare the compositions of this invention as aqueous dispersions because they can be more readily applied in this form to the wallboard or other structural member to be coated.

In order to maintain the various water-soluble constituents in suspension, a suspending agent such as sodium carboxymethyl cellulose may be used. Other suitable suspending agents include methylcellulose, hydroxyethyl cellulose, and sodium alginate.

The coating compositions of this invention may be applied to the surface to be coated by conventional means such as an air knife coater, reverse roll coater, or wire wound doctor. These compositions may also be applied by means of a roller or a brush in a manner similar to that for applying paints to a surface, although in general these means are less satisfactory than the other means aforementioned.

The minimum coating weight giving effective fire-retardant properties to kraft paper liner for paperboard is about 30 pounds of solids per 1000 square feet of surface coated. Effective fire-retardancy is obtained at this coating weight, although slightly greater coating weights can be used. Substantially greater coating weights are generally avoided because the paper liner becomes unduly stiff. Different cellulosic materials generally require different coating weights for best results.

The compositions of this invention impart outstanding fire-resistance to inflammable cellulosic materials when compared with previously known coating compositions. However, in common with such previously known compositions, the wet rub resistance of the coatings of this invention is fairly low. Stated another way, the compositions of this invention are susceptible to water. This is because of the high amounts of water-soluble compounds and especially inorganic salts, which are components of the intumescent agent.

According to a preferred embodiment of this invention, it has been found that the web rub resistance can be substantially improved with virtually no sacrifice in intumescence, by applying a thin overcoat of wax on top of the aforedescribed intumescent coating composition after it has dried. Excellent results are obtained at a coating weight of about 14 pounds per 1000 square feet, although this weight is merely illustrative and not critical. The wax constituting this overcoat may be applied in aqueous emulsion or as a hot melt, the melt being preferable. No compounding agents are ordinarily added to the wax overcoat layer, in contrast to the intumescent agent and other ingredients which are compounded into the wax to form the primary intumescent coating composition of this invention.

The overcoat layer may be applied by conventional means, such as an air knife coater, reverse roll coater, or wire wound doctor, as previously indicated, on top of the intumescent coating layer after said layer is dried.

Alternatively, the fire-retardant compositions of this invention may be prepared in dry, solid form. Such dry compositions may have the same ingredients, except for the omission of water, as the aforedescribed dispersions. Best results in preparing dry compositions are obtained when the intumescing agents, pigments and other solid ingredients aside from the wax are blended together in the dry state and slowly added to molten wax or wax blends. The ratio and range of the various ingredients to one another is the same as has been previously stated with the exception that the ratio of intumescent and pigment solids to wax or wax blend or melt solids is somewhat reduced. The intumescent and pigment solids constitute about 50 to 60%, preferably about 55% of the total weight of the dry blend. The amount of pigment and intumescent solids in the dry blend must be sufficient so that, when a flame impinges on the coating, intumescence takes place before the wax has an opportunity to melt and run, carrying the intumescent solids with it. On the other hand, the quantity of intumescent and pigment solids must be low enough so that dispersions of these solids in molten wax are not too viscous to be handled by normally available coating methods. The use of molten wax dispersions makes possible the use of hot melt coaters such as the curtain coater and eliminates the drying period required by water base dispersions. The ease of coating rigid cellulosic materials by means of this latter type coater is greatly increased.

This invention will now be further described with reference to specific embodiments thereof, as illustrated by the examples which follow. Each of the examples below gives the composition of an intumescent fire-retardant coating composition of this invention, all parts being in parts by weight. In making up the compositions, ingredients are added in the order listed below.

EXAMPLE 1

| Ingredient: | Parts by wt. |
| --- | --- |
| Water | 60 |
| 5% water solution of medium viscosity sodium carboxymethyl cellulose | 34.5 |
| Hexamethylene tetramine | 30 |
| Monoammonium phosphate | 90 |
| Starch | 15 |
| Clay | 30 |
| Dicyandiamide | 30 |
| Potassium aluminum sulfate | 15 |
| "Mobilcer X" | 75 |

"Mobilcer X" is an acid-stable aqueous emulsion of a micro-crystalline hydrocarbon wax having a solids content of approximately 50%.

EXAMPLE 2

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Clay | 30 |
| Dicyandiamide | 30 |
| Potassium aluminum sulfate | 15 |
| "Mobilcer X" | 75 |

EXAMPLE 3

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Starch | 15 |
| Clay | 30 |
| Potassium aluminum sulfate | 15 |
| "Mobilcer X" | 75 |

EXAMPLE 4

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Starch | 15 |
| Dicyandiamide | 30 |
| Potassium aluminum sulfate | 15 |
| "Mobilcer X" | 75 |

EXAMPLE 5

| Ingredient: | Parts by wt. |
|---|---|
| Water | 60 |
| 5% Sodium carboxymethyl cellulose solution | 34.5 |
| Hexamethylene tetramine | 20 |
| Monoammonium phosphate | 90 |
| Starch | 15 |
| Clay | 30 |
| Dicyandiamide | 30 |
| Potassium aluminum sulfate | 15 |
| "Mobilcer X" | 75 |

EXAMPLE 6

| Ingredient: | Parts by wt. |
|---|---|
| Water | 60 |
| 5% Sodium carboxymethyl cellulose solution | 34.5 |
| Hexamethylene tetramine | 50 |
| Monoammonium phosphate | 70 |
| Starch | 15 |
| Clay | 30 |
| Dicyandiamide | 30 |
| Potassium aluminum sulfate | 15 |
| "Mobilcer X" | 75 |

EXAMPLE 7

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Starch | 15 |
| Clay | 30 |
| Dicyandiamide | 30 |
| Potassium aluminum sulfate | 15 |
| "Mobilcer X" | 112 |

EXAMPLE 8

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Starch | 15 |
| Clay | 30 |
| Dicyandiamide | 30 |
| Potassium aluminum sulfate | 15 |
| "Mobilcer Q" | 75 |

"Mobilcer Q" is an aqueous emulsion containing about 50% by weight of an acid-stable microcrystalline hydrocarbon wax having a melting point of about 170° F.

EXAMPLE 9

| Ingredient: | Parts by wt. |
|---|---|
| Water | 60 |
| 5% Sodium carboxymethyl cellulose solution | 34.5 |
| Hexamethylene tetramine | 30 |
| Monoammonium phosphate | 90 |
| Starch | 15 |
| Clay | 30 |
| Dicyandiamide | 30 |
| Potassium aluminum sulfate | 15 |
| "Mobilcer X" | 75 |
| "Saran Latex F 122–A20" | 25 |

"Saran Latex F 122–A20" is an acid-stable aqueous emulsion of polyvinylidene chloride, manufactured by Dow Chemical Co., Midland, Mich.

The above ingredients in each of the Examples 1 to 9 are added to a mixing vessel in the order named. All of the ingredients except the wax and the latex are added to a vessel equipped with a propellor type agitator and mixed until smooth. The resulting mixture is then transferred to a Waring blender and agitated for about 5 minutes. The finely dispersed mixture is transferred back to the vessel having the propellor type agitator, after which the wax emulsion, and the latex when used, are added.

The dispersions prepared as described above are applied to the surface of cellulose material such as Kraft paper in one or more passes through a coating machine, the coating or additional coating being dried after each application or pass. The total weight of coating after drying should be at least 30 pounds per 1000 square feet.

EXAMPLE 10

Kraft paper liner for paperboard is coated with the composition of Example 1, which is permitted to dry. Then an overcoat layer comprising "Mobilcer C" wax in 50% aqueous emulsion is applied at a coating rate of 14 pounds of wax per 1000 square feet of paper liner. "Mobilcer C" is an aqueous emulsion containing about 44% by weight of an acid sensitive paraffin wax having a melting point of about 130°.

Dry wax compositions, according to this invention, may be applied in the form of a hot melt. Example 11 illustrates the formation and application of such dry composition.

EXAMPLE 11

A dry blend of the following ingredients is prepared:

| Ingredient: | Parts by wt. |
|---|---|
| Hexamethylene tetramine | 30 |
| Monoammonium phosphate | 90 |
| Starch | 15 |
| Clay | 30 |
| Potassium aluminum sulfate | 15 |

125 parts by weight of the above dry blend is then dispersed in 100 parts by weight of paraffin wax in the molten state.

The above described dry blend is applied to the surface of cellulosic board while the wax is in the molten state. This coating is applied in a coating weight of at least 40 pounds per 1000 square feet.

EXAMPLE 12

130 parts by weight of the dry blend cited in Example 11 is added to the following compounded wax blend in the molten state.

| Ingredient: | Parts by wt. |
|---|---|
| Petroleum wax | 50 |
| Aroclor 2565 | 50 |
| Elvax 260 | 30 |

Aroclor is a chlorinated diphenyl manufactured by Monsanto Chemical Company.

Elvax 260 is a vinyl resin manufactured by E. I. du Pont de Nemours & Co.

This coating is applied in weights of at least 40 pounds per 1000 square feet.

The present invention provides an economical and highly effective fire-retardant composition which may be applied to cellulosic materials, such as paperboard, fiberboard, wood, and the like.

What is claimed is:

1. A fire-retardant coating composition comprising hexamethylene tetramine, a substantially non-volatile and heat-decomposable inorganic intumescent agent, and a hydrocarbon wax, said wax being present in proportions at least sufficient to impart fire retardant properties in cooperation with said hexamethylene tetramine and said agent in said composition.

2. A composition according to claim 1 in which said inorganic compound is an ammonium salt.

3. A composition according to claim 1 in which said inorganic compound is a phosphate.

4. A composition according to claim 1 including a binder.

5. A composition according to claim 2 in which said ammonium salt is monoammonium phosphate.

6. A composition according to claim 4 in which said hydrocarbon wax is a microcrystalline wax.

7. An aqueous dispersion for use as a fire-retardant coating composition comprising hexamethylene tetramine, a substantially non-volatile and heat-decomposable inorganic intumescent agent, a hydrocarbon wax, a suspending agent, and water, said wax being present in proportions at least sufficient to impart fire retardant properties in cooperation with said hexamethylene tetramine and said inteumescent agent in said composition.

8. A dispersion according to claim 7 in which said inorganic intumescent agent is an ammonium salt.

9. A dispersion according to claim 7 including a binder.

10. A dispersion according to claim 7 including dicyandiamide.

11. A dispersion according to claim 7 containing clay.

12. A dispersion according to claim 7 containing starch.

13. A process for flameproofing paperboard which comprises applying thereto the dispersion of claim 7 and allowing said dispersion to dry to form a fire-retardant coating.

14. A dispersion according to claim 8 in which said ammonium salt is monoammonium phosphate.

15. A dispersion according to claim 9 in which said hydrocarbon wax is a microcrystalline wax.

16. A fire-retardant composition for application as a hot melt, said composition comprising hexamethylene tetramine, a substantially non-volatile and heat-decomposable inorganic intumescent agent, and a hydrocarbon wax, said wax being present in proportions at least sufficient to impart fire retardant properties in cooperation with said hexamethylene tetramine and said agent in said composition.

17. The composition of claim 16 wherein said agent is an ammonium salt and said wax is present in weight proportion of at least about 19% of said composition.

18. The composition of claim 17 wherein the weight proportion of said wax is about 44% of said composition.

19. Fire resistant paperboard having a fire-retardant coating composition comprising hexamethylene tetramine, a substantially non-volatile and heat-decomposable inorganic intumescent agent, and a hydrocarbon wax, said wax being present in proportions at least sufficient to impart fire retardant properties in cooperation with said hexamethylene tetramine and said agent in said composition.

20. A fire resistant paperboard according to claim 19 having an overcoat of a hydrocarbon wax on said fire-retardant coating.

References Cited

UNITED STATES PATENTS

| 1,971,274 | 8/1934 | Richter et al. | 117—92 XR |
| 2,368,660 | 2/1945 | Hochstetter | 252—8.1 XR |
| 2,443,222 | 6/1948 | Bergstein | 117—92 XR |
| 2,780,566 | 2/1957 | Luxembourg | 106—15 XR |
| 2,784,159 | 3/1957 | Fluck et al. | 117—137 XR |
| 2,893,881 | 7/1959 | Sakornbut | 106—15 |
| 2,917,476 | 12/1959 | Peterson et al. | 117—137 XR |
| 2,970,932 | 2/1961 | Edlund | 117—92 XR |
| 2,986,478 | 5/1961 | Outterson | 117—137 |
| 3,284,216 | 11/1966 | Kaplan | 252—8.1 XR |
| 3,320,087 | 5/1967 | Erickson | 117—137 |

FOREIGN PATENTS

| 376,407 | 7/1932 | Great Britain. |
| 555,722 | 9/1943 | Great Britain. |

WILLIAM D. MARTIN, Primary Examiner

H. J. GWINNELL, Assistant Examiner

U.S. Cl. X.R.

106—15; 117—76, 137, 158; 252—8.1; 260—17.4